(12) United States Patent
Bollinger et al.

(10) Patent No.: US 12,474,104 B2
(45) Date of Patent: Nov. 18, 2025

(54) HARDENED REUSABLE MODULAR SHIPPER

(71) Applicant: Cryoport, Inc., Brentwood, TN (US)

(72) Inventors: Bret Bollinger, Yorba Linda, CA (US); Eden Sanchez, Bellflower, CA (US); Mike Dybicz, Nashville, TN (US); Bobby Onel, Laguna Beach, CA (US); Ben Lee, Corona, CA (US); Amanda Gessell, Brentwood, TN (US); James Wilbourn, Costa Mesa, CA (US); John Duval, Eugene, OR (US)

(73) Assignee: Cryoport, Inc., Brentwood, TN (US)

( * ) Notice: Subject to any disclaimer, the term of this patent is extended or adjusted under 35 U.S.C. 154(b) by 0 days.

(21) Appl. No.: 17/476,036

(22) Filed: Sep. 15, 2021

(65) Prior Publication Data

US 2022/0082317 A1 Mar. 17, 2022

Related U.S. Application Data

(60) Provisional application No. 63/078,734, filed on Sep. 15, 2020.

(51) Int. Cl.
*F25D 3/08* (2006.01)
*B65D 81/38* (2006.01)

(52) U.S. Cl.
CPC ........... *F25D 3/08* (2013.01); *B65D 81/3823* (2013.01); *F25D 2303/0843* (2013.01);
(Continued)

(58) Field of Classification Search
CPC .................. F25D 3/125; F25D 3/14; F25D 2303/084–2303/0845; F25D 3/08;
(Continued)

(56) References Cited

U.S. PATENT DOCUMENTS 3,057,506 A 10/1962 Wetlesen
4,307,581 A * 12/1981 Reid ..................... F25D 3/08
62/530
(Continued)

FOREIGN PATENT DOCUMENTS

CA 3118903 A1 5/2020
CN 204236906 U 4/2015
(Continued)

OTHER PUBLICATIONS

Machine English Language translation of KR20040080384 to Leba et al. Whole document. Translated Jun. 2023. (Year: 2004).*

(Continued)

*Primary Examiner* — Cassey D Bauer

(74) *Attorney, Agent, or Firm* — Snell & Wilmer L.L.P.

(57) ABSTRACT

Methods, systems, devices and/or apparatuses for a hardened reusable shipping container. The hardened reusable shipping container includes a lid. The lid is configured to be opened and closed. The hardened reusable shipping container includes a base enclosure. The base enclosure is coupled to the lid and has a payload area. The payload area is configured to receive a payload and maintain a temperature of an environment surrounding the payload. The hardened reusable shipping container includes an insert. The insert is configured to be positioned within the payload area to cool or maintain the temperature of the environment surrounding the payload.

8 Claims, 11 Drawing Sheets

(52) U.S. Cl.
CPC ............... *F25D 2303/0844* (2013.01); *F25D 2303/0845* (2013.01); *F25D 2331/804* (2013.01)

(58) Field of Classification Search
CPC ....... F25D 2303/081; F25D 2303/0843; F25D 2331/804; B65D 81/3823
See application file for complete search history.

(56) References Cited

U.S. PATENT DOCUMENTS

| | | | | |
|---|---|---|---|---|
| 4,474,033 A | * | 10/1984 | Baker | ................ F25D 3/08 62/457.2 |
| 5,312,182 A | | 5/1994 | Mlakar | |
| 5,388,691 A | | 2/1995 | White | |
| 5,413,410 A | | 5/1995 | Mlakar | |
| 5,599,082 A | | 2/1997 | Mlakar | |
| 5,816,433 A | * | 10/1998 | Higgins | ................ F25D 3/08 220/503 |
| 5,924,302 A | | 7/1999 | Derifield | |
| 6,244,458 B1 | | 6/2001 | Frysinger | |
| 8,800,797 B2 | | 8/2014 | Fingerhut | |
| 2010/0314397 A1 | | 12/2010 | Williams | |
| 2013/0062356 A1 | * | 3/2013 | Deka | ................ B65D 81/3823 220/592.25 |
| 2015/0060440 A1 | | 3/2015 | Lippold | |
| 2016/0244209 A1 | | 8/2016 | Hain | |
| 2017/0158411 A1 | | 6/2017 | Taka | |
| 2019/0234671 A1 | * | 8/2019 | Stanford | ............ B65D 81/3811 |
| 2020/0115140 A1 | | 4/2020 | Kuhn et al. | |
| 2022/0082317 A1 | | 3/2022 | Bollinger et al. | |
| 2024/0025598 A1 | | 1/2024 | Lee et al. | |

FOREIGN PATENT DOCUMENTS

| | | | | |
|---|---|---|---|---|
| CN | 110844347 A | | 2/2020 | |
| CN | 216944140 U | | 7/2022 | |
| DE | 20108553 U1 | | 9/2001 | |
| DE | 202006011143 | * | 10/2007 | ............ F25D 3/125 |
| JP | H06127573 A | | 5/1994 | |
| JP | 2003246329 A | | 9/2003 | |
| JP | 2004-042995 A | | 2/2004 | |
| JP | 3220792 U | | 4/2019 | |
| KR | 200337885 Y1 | * | 1/2004 | ............... F25D 3/08 |
| KR | 20040080384 | * | 9/2004 | ............... F25D 3/08 |
| KR | 20-0443141 Y | | 1/2009 | |
| KR | 101877721 B1 | | 7/2018 | |
| KR | 20210070785 A | | 6/2021 | |
| WO | WO-2014197511 A2 | * | 12/2014 | ............... B01L 7/04 |
| WO | 20180058859 A | | 1/2018 | |
| WO | WO-2019079186 A1 | * | 4/2019 | ............... B65B 5/04 |
| WO | 2020157488 A | | 8/2020 | |

OTHER PUBLICATIONS

Machine English Language translation of DE202006011143 to Dreiss et al. Whole document. Translated Jun. 2023. (Year: 2007).*
English language translation of KR200337885 to Seol. Translated Jul. 2024 (Year: 2004).*
PCT; International Search Report and Written Opinion issued by KIPO dated Dec. 21, 2021 in PCT Application Serial No. PCT/US2021/050470.
USTO; Restriction Requirement dated Apr. 24, 2023 in U.S. Appl. No. 17/868,088.
USPTO; Non-Final Office Action dated Jun. 30, 2023 in U.S. Appl. No. 17/868,088.
PCT; Notification of Transmittal of International Search Report and the Written Opinion of the International Searching Authority dated Nov. 9, 2023 for Application No. PCT/US2023/027652.
PCT; International Preliminary Report on Patentability (IPRP) issued by KIPO dated Mar. 30, 2023 in PCT Application Serial No. PCT/US2021/050470.
USPTO; Notice of Allowance dated Nov. 1, 2023 for U.S. Appl. No. 17/868,088.
UK; 2nd Office Action dated Aug. 13, 2024 in Application Serial No. 2303846.6.
EP; Search Report dated Aug. 20, 2024 in Application Serial No. 21870137.3.
UK; Third Office Action dated Jan. 16, 2025 in Application No. 2303846.6.
UK; First Office Action dated May 16, 2024 in Application Serial No. 2303846.6.
USPTO; Notice of Allowance dated Mar. 11, 2024 in U.S. Appl. No. 17/868,088.

* cited by examiner

HARDENED REUSABLE MODULAR SHIPPER

CROSS-REFERENCE TO RELATED APPLICATIONS

This application claims priority to and the benefit of U.S. Provisional Patent Application No. 63/078,734, titled "HARDENED REUSABLE MODULAR SHIPPER," filed on Sep. 15, 2020, and the entirety of which is hereby incorporated by reference herein.

BACKGROUND

1. Field

This specification relates to a system, an apparatus and/or a method for a modular shipping container that has interchangeable components to protect payloads that are stored in the shipping container during transport and/or storage.

2. Description of the Related Art

In the health, medical, pharmaceutical and/or life science industries, the safe storage of a payload in a temperature-controlled and watertight environment is an important aspect of the industry. Typically, when a payload is shipped, the shipper packs the payload into an enclosure, which is non-reusable, such as a carboard box, and may pack shipping material, such as a polystyrene foam container and/or dry ice, around the payload to maintain the temperature. The shipper may place or scoop dry ice pellets or blocks into an inner packaging made of an insulating material, such as the polystyrene foam, and around the payload to maintain the temperature of the payload. The shipper may place the inner packaging within an outer enclosure, such as a sturdy cardboard box, and partially seal the outer enclosure. Due to this configuration, the use of dry ice limits the shipper to transporting the payload in a single temperature range. Moreover, the shipper can be opened and refilled with dry ice throughout the transport and delivery in order to maintain the temperature if dry ice finishes evaporating.

Accordingly, there is a need for a system, apparatus and/or method for a hardened, reusable and/or modular shipping container.

SUMMARY

In general, one aspect of the subject matter described in this specification is embodied in a hardened reusable shipping container. The hardened reusable shipping container includes a lid. The lid is configured to be opened and closed. The hardened reusable shipping container includes a base enclosure. The base enclosure is coupled to the lid and has a payload area. The payload area is configured to receive a payload and maintain a temperature of an environment surrounding the payload. The hardened reusable shipping container includes an insert. The insert is configured to be positioned within the payload area and to cool or maintain the temperature of the environment surrounding the payload.

These and other embodiment may optionally include one or more of the following features. The insert may be a payload insert that houses dry ice below and around sides of the payload insert to allow the dry ice to be placed below and around the payload when inserted. The hardened reusable shipping container may include a payload holder. The payload holder may be configured to be positioned in and fit within the insert. The payload holder may be configured to receive the payload when the payload is inserted within. The payload holder may be configured to hold and position the payload within the insert.

The hardened reusable shipping container may include a dry ice basket. The dry ice basket may be positioned above the payload holder and the payload insert. The dry ice basket may be configured to hold dry ice so that the dry ice is at least partially on top of and at least partially covers the payload when the payload is within the payload holder. The insert may include a cable routing along at least one side of the insert. The cable routing may allow one or more probes to be inserted within the payload area. A vent may be positioned on the base enclosure and configured to allow for gas to be released from the payload area.

The hardened reusable shipping container may include one or more channels (e.g., grooves). The one or more grooves or channels may be recessed within faces of the lid and the base enclosure. The hardened reusable shipping container may include one or more fasteners. The one or more fasteners may be positioned within the one or more grooves to couple the lid with the base enclosure when the lid is in the closed position.

The hardened reusable shipping container may include a document compartment. The document compartment may be at least partially or fully recessed within the lid and configured to receive one or more documents. The hardened reusable shipping container may include wherein a rear face of the base enclosure is removable or includes a panel that is configured to be removed. The hardened reusable shipping container may include wherein at least a portion of a rear face of the base enclosure includes a panel that is configured to be at least one of: removed and opened. The hardened reusable shipping container may include a layer of phase-change material. The phase-change material may be on an inner surface of the insert. The insert may be a removable vacuum insulated panel. The insert and the layer of phase-change material may be configured to maintain the temperature of the environment at different temperature ranges or bands.

In another aspect, the subject matter may be embodied in a modular shipping container. The modular shipping container includes a lid configured to be opened and closed. The modular shipping container includes a base enclosure coupled to the lid. The base enclosure has a payload area that is configured to receive a payload and maintain a temperature of an environment surrounding the payload. The modular shipping container includes one or more removable vacuum insulated panels positioned within the payload area. The modular shipping container includes a layer of phase-change material. The layer of phase-change material is disposed on an inner surface of the one or more removable vacuum insulated panels.

These and other embodiment may optionally include one or more of the following features. The modular shipping container may include an insulative material within walls of the lid and the base enclosure. The modular shipping container may include a gasket. The gasket may be positioned between the lid and the base enclosure when the lid is closed to form a watertight seal between the lid and the base enclosure. The gasket may have one or more holes to let gas to escape. The modular shipping container may include a vent having a one-way valve that allows gas to be released from the payload area. The one or more removable vacuum insulated panels may include a plurality of removable vacuum insulated panels that are positioned at a bottom of the payload area, along the walls of the payload area, and on an inner surface of the lid to surround and enclose the payload area. The modular shipping container may include one or more fasteners or connectors that are configured to connect to an additional storage container to hold or carry the additional storage container.

In yet another aspect, the subject matter may be embodied in a hardened reusable shipping container. The hardened reusable shipping container includes a lid. The lid is configured to be opened and closed. The hardened reusable shipping container includes a base enclosure. The base enclosure is coupled to the lid. The base enclosure has a payload area that is configured to receive a payload and maintain a temperature of an environment surrounding the payload. The hardened reusable shipping container includes a cavity on the lid or on or within the base enclosure. The cavity is configured to house an electronic device.

These and other embodiment may optionally include one or more of the following features. The cavity may have one or more openings to receive wiring to electronically couple the electronic device to one or more sensors positioned within the payload area. The electronic device may be a data logger configured to receive, store, and transmit data from the one or more sensors. The cavity may have one or more layers of covers configured to enclose the cavity. The cavity may be within the base enclosure between an exterior surface and an interior surface of the base enclosure. The cavity may have an opening accessible from a top of the base enclosure to insert the electronic device into the cavity.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale, and may be exaggerated to better illustrate the important features of the present disclosure.

DETAILED DESCRIPTION

Disclosed herein are systems, devices and/or methods for a hardened reusable modular shipping container (or "shipper") that maintains a temperature within the payload area within a temperature range. The shipper may be made from a hardened material, such as a polycarbonate, polyethylene, or other polymer, which protects the payload in the payload from environmental factors, such as shock and vibrations. Moreover, since the shipper is made from the hardened material, the shipper may be decontaminated and cleaned, which allows for re-use of the shipper.

Other benefits and advantages include the use of a phase-change material within or inside the walls of the shipper and/or positioned within the cavity of the shipper to maintain the temperature within the payload area of the shipper, and consequently, the temperature of a payload positioned within the payload area. By using the phase-change material, the shipper may maintain and/or manage the temperature within the payload area. The temperature within the payload area is not limited to a single temperature range, e.g., limited to the temperature of the dry ice when dry ice is used as the temperature control medium. Instead, the shipper has the flexibility to maintain the temperature of the payload at various different temperature ranges, which may be set using the phase-change material as the temperature control medium.

Additionally, the shipper may have a document holder, data logger, electronic label ("e-label") and/or environmental monitoring capabilities, such as sensors, displays and/or other environmental monitoring devices and features including a temperature monitoring device. These integrated features provide additional capabilities to assist and/or facilitate in the transport, delivery and storage of the shipper.

Figure 1A:
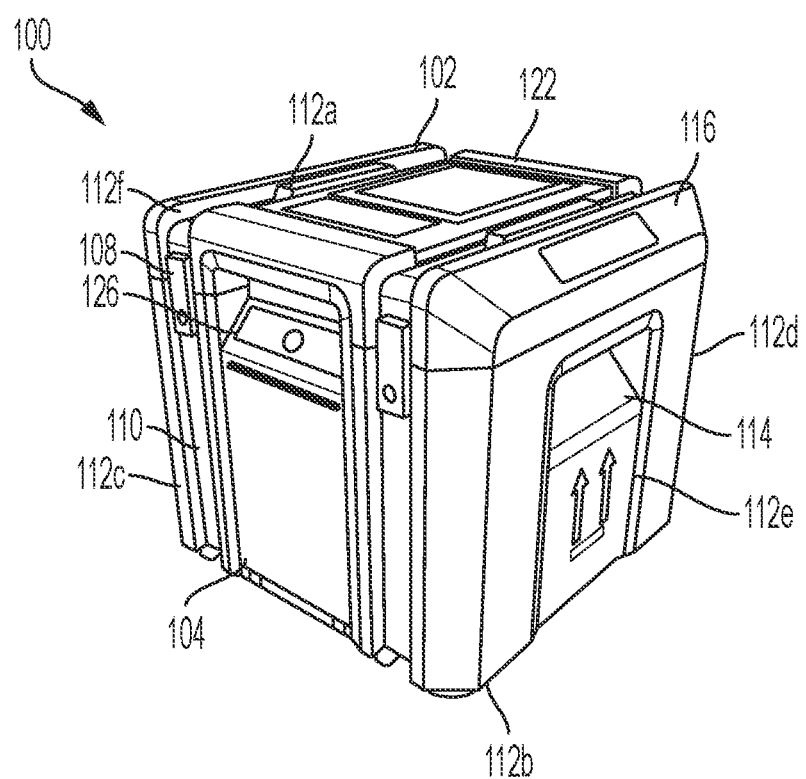
FIG. 1A shows an example of a hardened, reusable and/or modular shipping container according to an aspect of the disclosure.
Figure 1B:
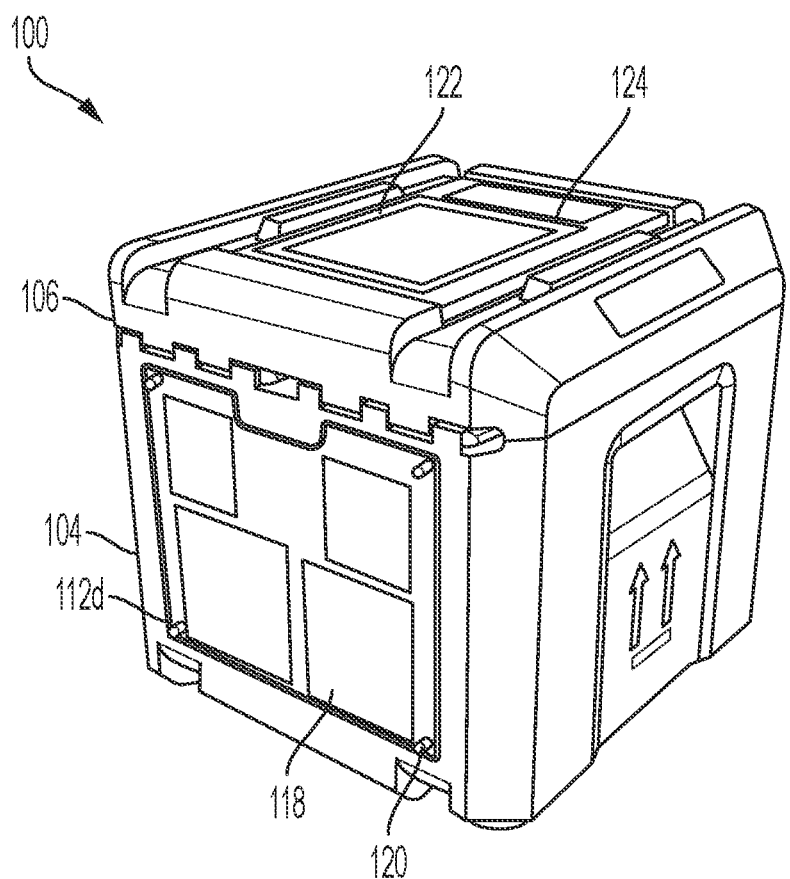
FIG. 1B shows a rear perspective view of the hardened, reusable and/or modular shipping container of FIG. 1A according to an aspect of the disclosure.

FIGS. 1A-1B show an exterior view of the shipper 100 that maintains a temperature-controlled environment for a payload within a payload area. FIG. 1A shows a front perspective view of the shipper 100. FIG. 1B shows a rear perspective view of the shipper 100. The shipper 100 may be a made from a hardened or rigid material, such as a polyethylene, polycarbonate, or other polymer, which may be cleaned and decontaminated and then reused. The hardened or rigid material protects the shipper 100 during transport and may be made of a material that is designed to absorb shocks and vibrations that occur during transport. The shipper 100 may have a material or coating exposed on the exterior of the shipper 100 that allows for adhesives (e.g., labels, logos, signs) to bond to.

The shipper 100 may be an enclosure that has a lid 102 or other cover and a base 104. The enclosure may be shaped as a cube or other three-dimensional polygonal shape with multiple faces 112a-f, which allows the shipper 100 to be stacked. The shipper 100 may be stacked on top of another shipper when the shippers are at an approximately 90 degree angle, e.g., when the shippers are upright. On a face of the one or more faces 112a-f, the serial number of the shipper 100 may also be molded onto one of the faces. The one or more faces 112a-f, one or more edges, or one or more corners of the shipper 100 may include bumpers. The bumpers may be made from a polymer, such as rubber. The bumpers may mitigate or prevent damage to the shipper 100 during transport.

The different faces 112a-f or portions 118 thereof may be designed to be modular, e.g., the different faces 112a-d or the portions 118 may be removable from and/or interchangeable with the other faces 112a-f or portions 118. The one or more faces 112a-f or portions 118 may be removed, e.g., by unfastening one or more fasteners 120, and replaced with a replacement face or portion, as shown in FIG. 1B for example.

For example, the portion 118 on the rear face 112d may have one or more packaging labels, and so, removing and replacing the portion 118 may be quicker than removing the one or more packaging labels, which increases the availability of the shipper 100. The portion 118 may be re-usable or non-reusable and/or engraved to show correct placement of one or more labels or could be blank. This modular design allows the user to replace the portion 118 that has the shipping labels with a replacement portion that has new shipping labels more expeditiously than replacing the shipping labels. Moreover, by switching and replacing the portion 118, a user may remove the old shipping labels at a later time. This improves the turnaround time for the shipper 100. Additionally, this modularity and interchangeability reduces costs as the different faces may interchanged with similar spare parts. Further, the portion 118 may be reversible. For instance, the portion 118 may feature opposing side surfaces where different shipping labels, signs, handling instructions and/or care instructions may be attached or adhered. For example, for a first leg of transportation, a first side of the portion 118 having a first shipping label may be facing away from the rear face 112d to be visible to a handler and, for a second leg of transportation, a second side of the portion 118 having a second shipping label may be facing away from the rear face 112d to be visible to the handler.

In some implementations, the shipper 100 may be designed to hold or carry another or an additional storage container on the rear face 112d of the shipper 100. The rear face 112d of the shipper 100 may have one or more additional fasteners or connectors that fasten (e.g., connect, couple) to the additional storage container to hold and/or carry the additional storage container, e.g., as a backpack. The additional storage container may be used to store accessories or other documents.

The lid 102 may be positioned on top of the base 104 and may be movable between an open position and a closed position. On the rear face 112d of the shipper 100, the shipper 100 may have one or more attachment devices 106, such as a swing, pivot, or hinge, that is positioned on a rear face 112d of the shipper 100, which couple to the rear portion of the lid 102 and the rear portion of the base 104. The one or more attachment devices 106 may couple the lid 102 and the base 104 and allow a front portion of the lid 102 to swing or move to an open position from a closed position to allow a user access to the payload area of the base 104. And, the one or more attachment devices 106 may allow the front portion of the lid 102 to swing or move to a closed position from the open position to position the lid 102 over the base 104 so that the user may seal or enclose the payload area of the shipper 100. In some embodiments, the one or more attachment devices 106 may be molded-in hinges. In some embodiments, the one or more attachment devices 106 may be bolted, screwed, riveted, or the like to allow replacement of the lid 102, the base 104, or the attachment devices 106.

On the front face 112c of the shipper 100, the shipper 100 may have one or more fastening devices 108, such as a clip, buckle, latch, or other connector configured for fastening. The one or more fastening devices 108 may have one portion or end that is positioned on the lid 102 and/or the base 104 which clips, couples to, latches, buckles, snaps-on or otherwise fastens, connects or otherwise couples to a second portion or end that is positioned on the other of the lid 102 and/or the base 104. When the lid 102 is positioned in the closed position and the two portions or ends of the one of more fastening devices 108 are coupled, fastened or otherwise connected, the shipper 100 forms a sealed enclosure that may be at least partially sealed against infiltration by external fluids and/or release of fluids from inside the sealed enclosure. In various embodiments, the shipper 100 is water resistant. In various embodiments, the shipper 100 is watertight.

The one or more fastening devices 108 may be positioned within one or more channel 110 (e.g., groove) such that the one or more fastening devices 108 do not protrude outward and are flush with the one or more faces 112a-f and are flush with the edges of the one or more channel 110. This prevents the one or more fastening devices 108 from latching onto an obstruction during transport and/or storage. The one or more channel 110 may be formed from an indentation or be recessed within one or more faces 112a-e of the shipper 100. For example, the one or more channel 110 may be indented or recessed within and extend along each of the one or more faces lengthwise, such as the top face 112a, the bottom face 112b, the rear face 112d and/or the front face 112c. The one or more channel 110 may extend along the length of top face 112a, the bottom face 112b, the front face 112c and/or the rear face 112d such that the one or more channel 110 are parallel and partially or fully circumnavigate a perimeter or a portion of the perimeter of the one or more of the side faces 112e-112f.

On the one or more faces 112a-d, the shipper 100 may have one or more handle portions 114, which may be recessed within the one or more faces 112a-f. The one or more handle portions 114 may be recessed within the one or more faces 112a-f of the shipper 100 so that the handle portions 114 at least partially do not protrude away from the one or more faces 112a-f, which reduces the delivery and/or storage profile of the shipper 100. The one or more handle portions 114, allow a user, a shipper, or other person to hold, grasp, lift and/or otherwise position the shipper 100 upright during shipment, delivery and/or transport.

The shipper 100 may have an angled transition portion 116 between two or more faces 112a-f, such as between the top face 112a or the bottom face 112b and the side faces 112e-f. The angled transition portion 116 may angle outward from one face, such as the top face 112a, the bottom face 112b, the front face 112c and/or the rear face 112d, to one or more of the side faces 112e-f. The angled transition portion 116 allows any water or liquid to runoff, while maintaining the cubicle structure of the shipper 100, which allows two or more shippers 100 to be stacked on top of one another or positioned adjacent to one another for easy and/or compact storage and/or transport.

The shipper 100 may have a document compartment 122. The document compartment 122 may be recessed into one of the faces 112a-f of the shipper 100, such as the top face 112a, and/or a transparent or semi-transparent window or cover 124. For example, the document compartment 122 may be positioned within the lid 102 of the shipper 100.

The document compartment 122 may receive one or more documents, such as a shipping label that is inserted. The document compartment 122 may hold other accessories needed by a user, such as a freezer box, serialized zip ties, or other accessories to facilitate storage and/or transport of the shipper 100. Once positioned within the document compartment 122, the window or cover 124 may allow a user to view the shipping label. The document compartment 122 and/or the window or cover 124 may have printed instructions, such as loading and/or unloading instructions or a QR code to indicate handling or shipping instructions to a deliverer, recipient, or other user.

Figure 1C:
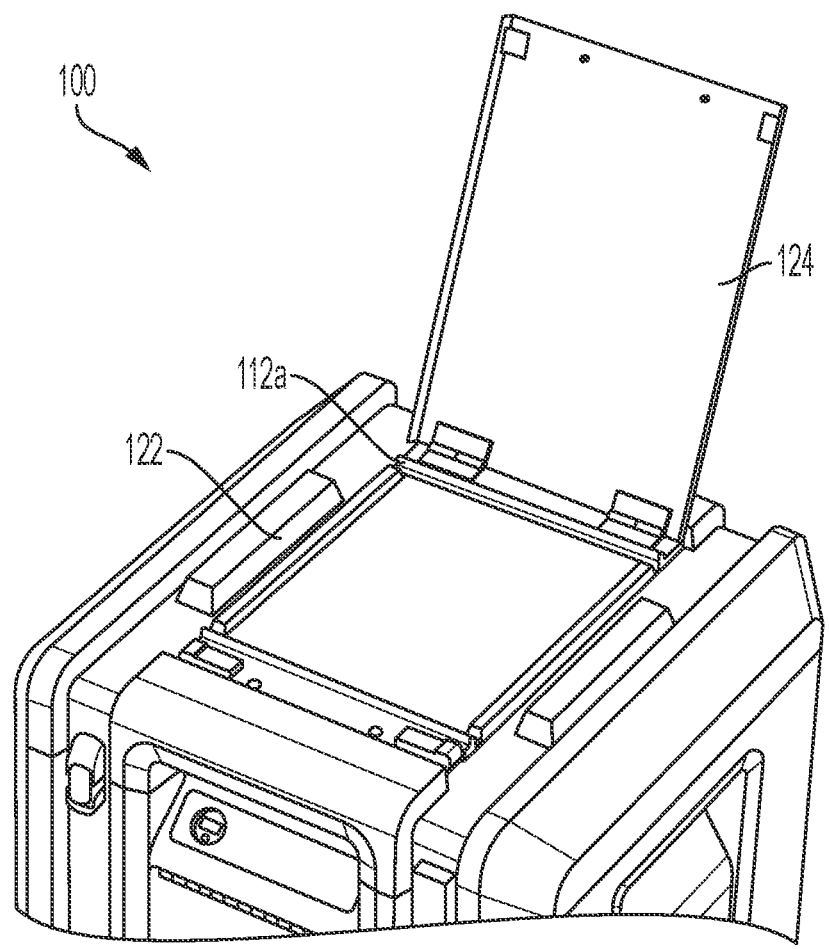
FIG. 1C shows a top perspective view of the hardened, reusable and/or modular shipping container of FIG. 1A according to an aspect of the disclosure.

In some implementations, the document compartment 122 may be recessed into one of the faces 112a-f of the shipper 100. For example, the document compartment 122 may be flush with the top face 112a of the shipper 100, as shown in FIG. 1C for example. A portion of the document compartment 112, such as the window or cover 124 may be opened, unlocked or be raised from the top face 112a of the shipper 100. Once raised, the document compartment 122 may receive one or more documents. The document compartment 122 may have one or more dividers or partitions within. The one or more dividers or partitions separate out the various documents inserted, e.g., documents for different shipping legs of a shipping itinerary. Then, the window or cover 124 that is raised and/or opened may be lowered, locked and/or otherwise closed. Once closed, the window or cover 124 protects the one or more documents within the document compartment 122 from the environment. This also secures the documents within the document compartment 122 and prevents access to the documents that have been inserted and/or received.

Figure 1D:
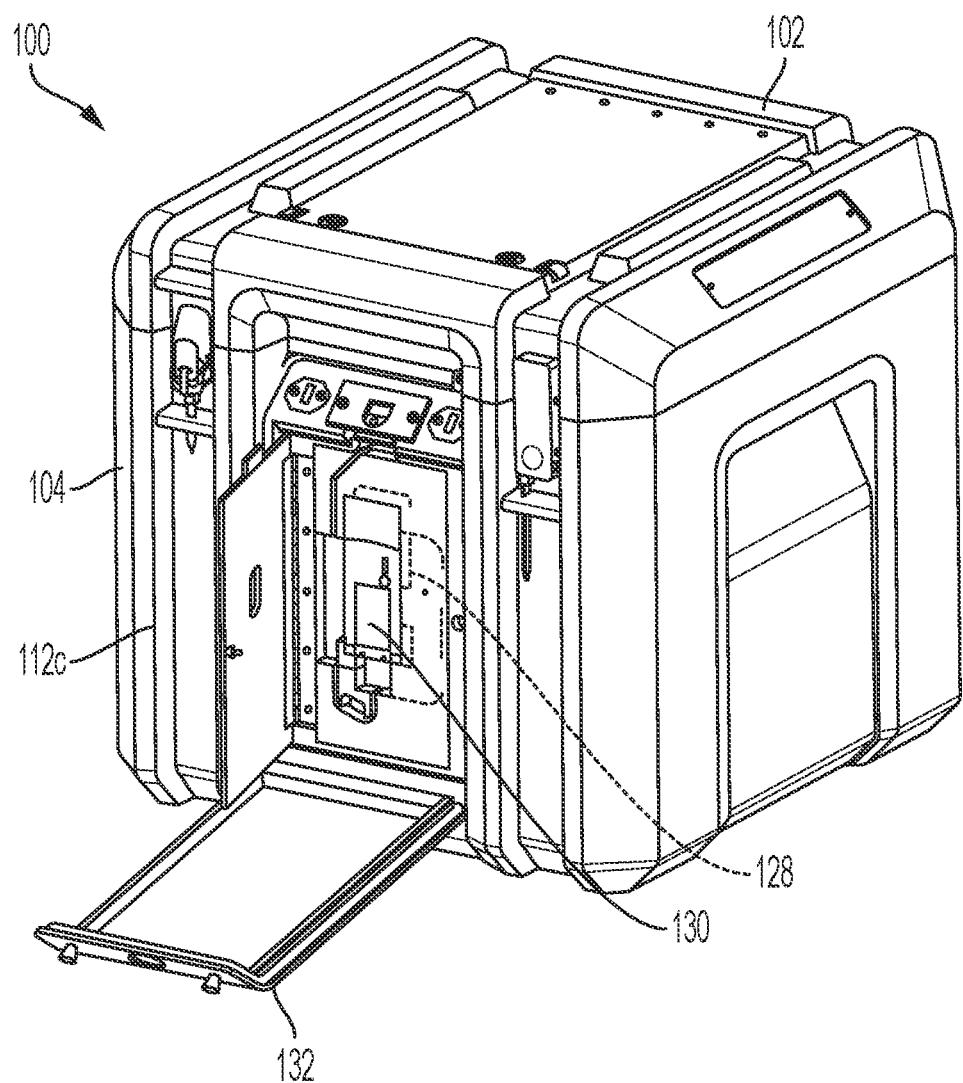
FIG. 1D shows a front perspective view of the hardened, reusable and/or modular shipping container of FIG. 1A according to an aspect of the disclosure.

The shipper 100 may have or be coupled to a data logger 130, as shown in FIG. 1D for example, the electronic label (or "e-label") 126 (see FIG. 1A) and/or another electronic device, such as a temperature display. The data logger 130, e-label 126 and/or other electronic device may display monitoring data from one or more sensors, such as a thermocouple, that may be positioned within the payload area and/or otherwise on the shipper 100 to monitor internal or external environmental attributes and generate corresponding sensor data. The data logger 130, e-label 126 and/or other electronic device may each have their own thermocouple or other sensors and/or cables to monitor the temperature or other sensor data. The thermocouple or other sensors and/or cables may be positioned within the shipper 100. The sensor data may indicate the temperature within the payload area and/or outside the shipper 100, location, pressure, humidity, orientation, light, vibrations and/or other sensor data related to the transport, storage and/or shipment of biological materials. The e-label 126 or other display may display or provide information including the sensor data, location data, shipment data and/or other information that facilitates the transport, storage and/or shipment of the payload, such as biological materials. The different components, such as the data logger 130, e-label 126 and/or one or more sensors may communicate via a wired or a wireless connection and may have one or more processors, memories and/or user interfaces, such as a display. In some embodiments, the e-label 126 may have a transparent or semi-transparent cover. The cover may protect the e-label 126 from impact and debris.

FIG. 1D shows the various components coupled to and/or integrated or included within the shipper 100. The shipper 100 may have a cover or access panel 132, which may slide-on and slide-off along one or more grooves or channels within the one or more faces 112a-d, such as the front face 112c, snap on and snap off, or flip open and flip-close to provide access to the data logger 130 and/or e-label 126.

When the cover or access panel 132 is slid-off, snapped off, or flipped open, a cavity or recessed portion, such as an electronic device cavity 128, that houses a data logger 130, the e-label 126 and/or other electronic device may be exposed. In some embodiments, there may be multiple cover layers. For example, the shipper 100 may have an inner cover enclosed by the cover or access panel 132 as shown in FIG. 1D. The inner cover may be opened or closed in a different direction or using a different method (e.g., slid-off, snapped off, flipped open) than the cover or access panel 132. The shipper 100 may have a latching mechanism that locks the cover or the access panel 132 in the closed position. One or more sensors coupled to the data logger 130, the e-label 126 and/or other electronic device may be within the payload area and corresponding cables are routed to the electronic device cavity 128 in the front of the shipper 100 through a channel to couple the data logger 130, the e-label 126 and/or other electronic device with the sensor. The cables may be routed in the same or different channels.

Figure 1E:
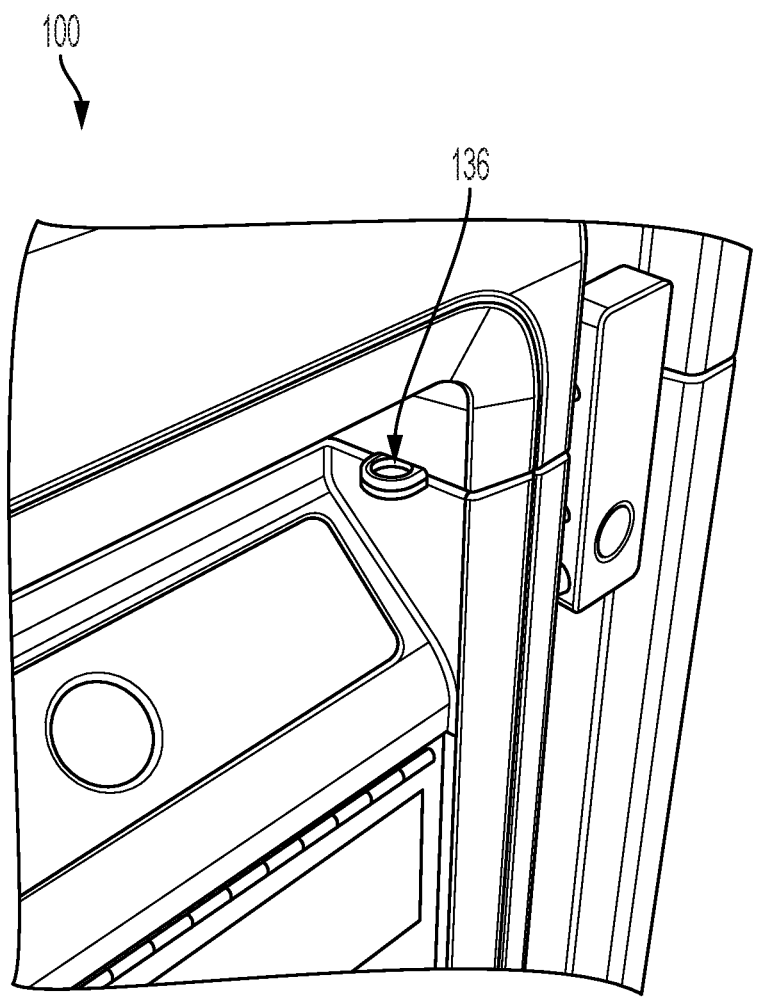
FIG. 1E shows a close-up front perspective view of the hardened, reusable and/or modular shipping container FIG. 1A according to an aspect of the disclosure.

Above the electronic device cavity 128, the shipper 100 may have a hole or opening, e.g., a zip-tie hole 136, as shown in FIG. 1E for example. The zip-tie hole 136 may be positioned near, on, or in proximity to the one or more fastening devices 108. When a zip-tie is inserted into and fastened around the zip-tie hole 136 when the lid 102 is closed, the zip-tie may indicate to a user if the lid 102 has been opened or otherwise been tampered with.

Figure 2:
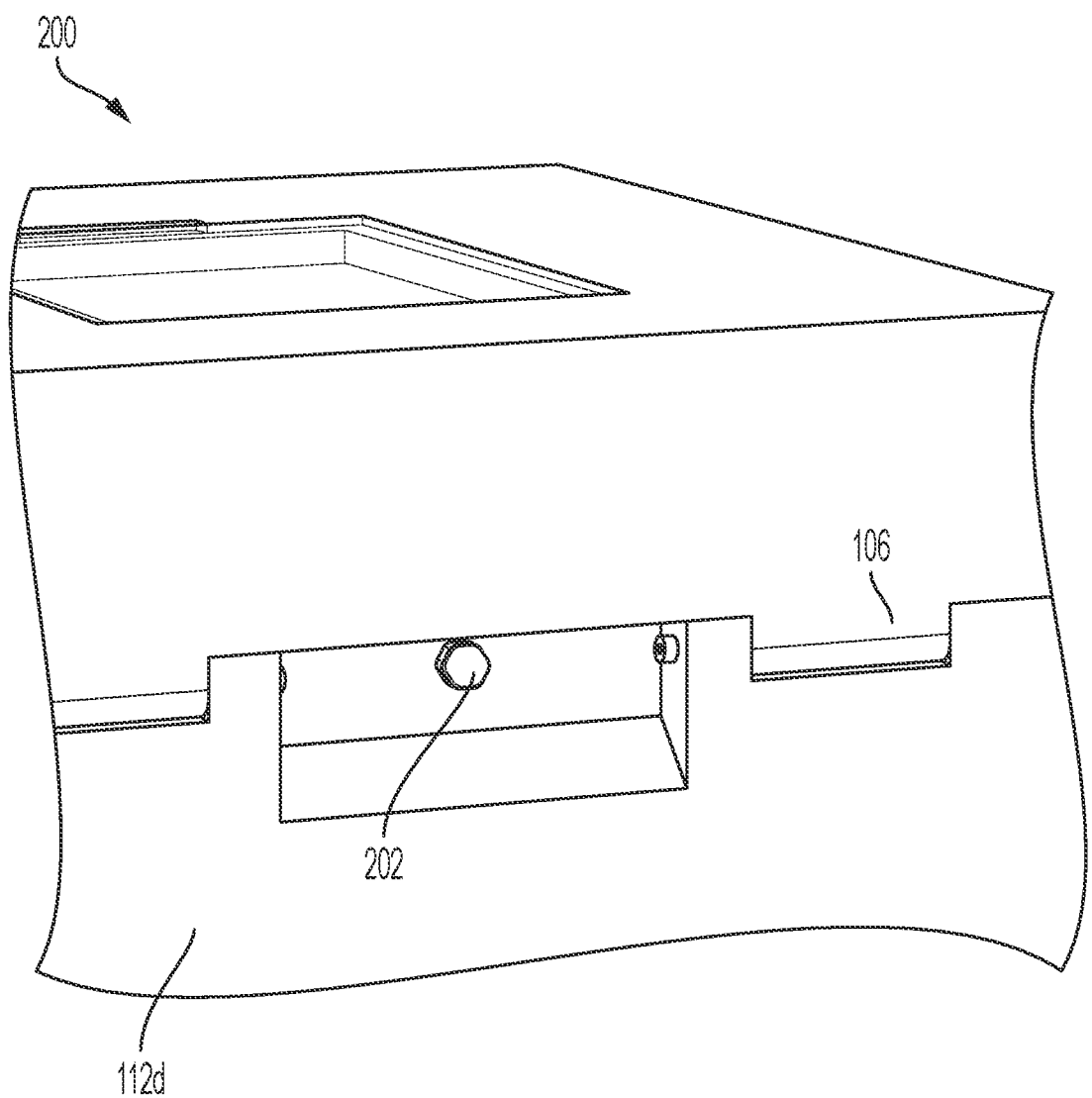
FIG. 2 shows the vent on the rear of the hardened, reusable and/or modular shipping container of FIG. 1A according to an aspect of the disclosure.

The shipper 100 may have a vent 202. FIG. 2 shows a close-up view of the rear of the shipper 100. The vent 202 may be positioned near and/or in proximity to the one or more attachment devices 106 on the rear face 112d of the shipper 100, as shown in FIG. 2 for example. In various instances, the vent 202 may comprise a device inserted into an aperture to control passage of gas. In further instances, the vent 202 may comprise a hole, such as a mouse hole. The vent 202 may be coupled to a one-way valve, which allows for gas to be released from the payload area of the shipper 100. The one-way valve may be reusable or used once. The vent 202 may be circular or have a polygonal shape, such as a hexagon as shown in FIG. 2. The vent 202 may have sharp, filleted, or chamfered edges, and may include an insert, such as a device inserted into an aperture. The vent 202 may be a pressurized vent, meaning that the vent 202 may selectably vent gas in response to the gas having a pressure above a threshold. The pressurized vent may selectably vent gas in response to a pressure differential between different sides of a passageway through the vent exceeding a threshold.

Figure 3:
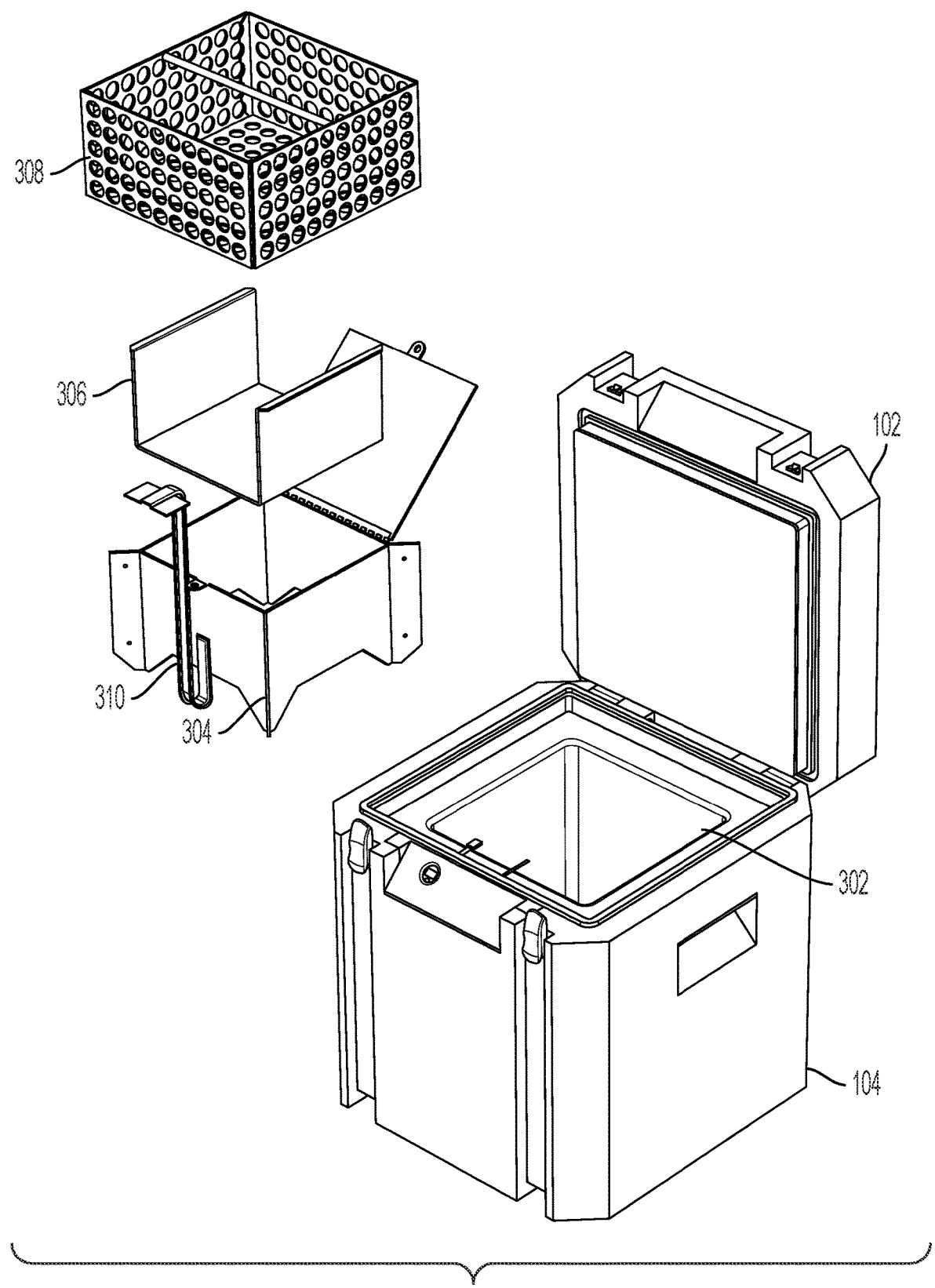
FIG. 3 shows an exploded view of the hardened, reusable and/or modular shipping container of FIG. 1A that operates in a single temperature range or band according to an aspect of the disclosure.

FIG. 3 shows an exploded view of the shipper 100. In one aspect, the shipper 100 may be implemented to receive or contain dry ice to cool and/or maintain the temperature within the payload area 302 of the shipper 100. The shipper 100 may have a payload area 302 that is within a cavity of the base 104 of the shipper 100, and which may, for example, be approximately 8 inches (about 20.3 cm)×8 inches (about 20.3 cm)×8 inches (about 20.3 cm) or approximately 320 cubic inches (about 5244 cubic cm). The payload area 302 may be larger or smaller or differently shaped as desired. While the payload area 302 as described above is described with cubic shape in one non-limiting example, other shapes are contemplated. The payload area 302 may receive and/or store a payload insert 304 that houses the dry ice that cools and/or maintains the temperature within the payload area 302 of the shipper 100 and/or the payload when the payload is inserted or positioned within the payload insert 304 within the shipper 100.

Figure 4:
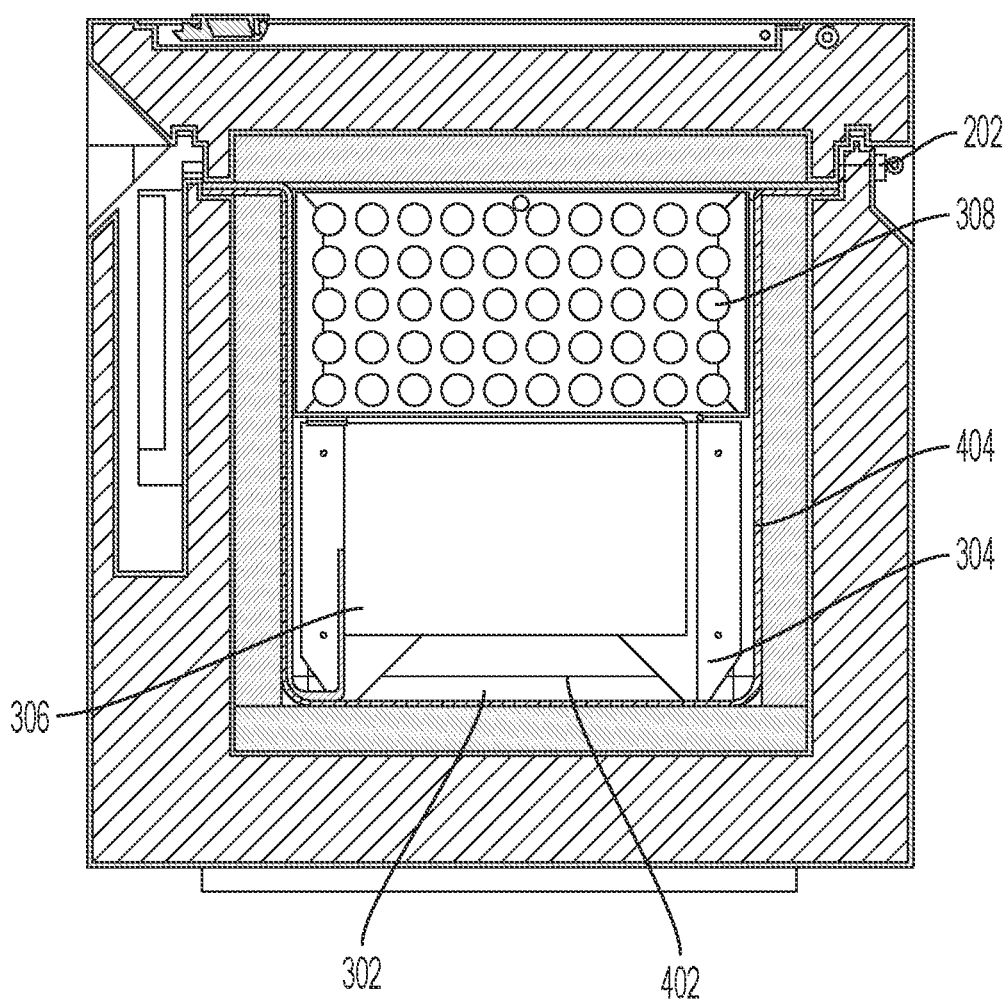
FIG. 4 shows a cross-sectional view of the hardened, reusable and/or modular shipping container of FIG. 3 according to an aspect of the disclosure.

The payload insert 304 may be positioned within the payload area 302 and may house dry ice that cools and/or maintains the temperature within the payload area 302 of the shipper 100. The dry ice keeps the payload within the payload area 302 stored within a temperature range. The payload insert 304 may store a portion of the dry ice below the payload insert 304, such as within the portion 402 (see FIG. 4), and/or around the sides of the payload insert 304, such as within the portion 404 (see FIG. 4). This allows the dry ice to be positioned below and around the payload when the payload is inserted into the payload holder 306.

The payload insert 304 may have cable routing 310 along one or more side of the payload insert 304 to allow for one or more probes, such as a temperature probe, thermocouple, or other sensor, to be inserted or located within the payload area 302 to monitor the temperature within the payload area 302. The cable routing 310 may provide a route or channel that receives and protects one or more probe wires that lead to and/or from the one or more probes that are inserted or located within the payload area 302.

The shipper 100 may include a payload holder 306. The payload holder 306 may be positioned and/or fit within the payload insert 304. The payload holder 306 may hold, immobilize and/or receive the payload when the payload is inserted within. The payload holder 306 may be adjustable and conform to the shape of the payload insert 304 and/or may be shaped to fit the shape of the payload as the dry ice sublimates. For example, the size of the payload holder 306 may be adjustable so that the shape of the payload holder 306 may be adjusted to the same shape of the payload that is to be received. And as the dry ice sublimates, the payload holder 306 may move vertically downward and keep the payload in place. For example, the payload holder 306 may have a sensor conduit that allows for vertical movement. In various instances, a vertical movement of approximately 2 inches (about 5.1 cm) is facilitated. Moreover, one or more zip ties may be used to provide tabs on the sensor conduit to define a vertical movement range, such as approximately 2 inch (about 5.1 cm) vertical movement. The payload holder 306 holds and positions the payload within the payload insert 304 so that the dry ice is fitted, placed and/or surrounds the payload, such as in a central location equidistant from the walls of the payload insert 304. In some implementations, a customizable foam may be inserted to facilitate holding the payload within the payload area 302.

The shipper 100 may have a vertical and/or a horizontal adjustment device or panel (or "adjustment device") that is positioned within, coupled to, or otherwise interfaced with the payload holder 306. The adjustment device may move dynamically including vertically and/or horizontally within the payload holder 306. The adjustment device, such as an adjustable panel, may move horizontally to accommodate or fit around varying payload sizes. The adjustment device may move vertically, e.g., downward, to adjust the position of the payload within the payload area as the dry ice sublimates. This allows the payload to be positioned centrally within the dry ice so that cooling of the payload is substantially equivalent surrounding the payload when positioned on the payload area and keeps the payload fixed in the payload holder 306.

The shipper 100 may include a dry ice basket 308. The dry ice basket 308 or other dry ice storage may be placed on top of and cover the payload holder 306 and the payload insert 304 so that the dry ice basket 308 is above and covers the payload when the payload is within the payload holder 306. The dry ice basket 308 may hold dry ice so that the dry ice is on top of and covers the payload when the payload is within the payload holder 306. The dry ice basket 308 may be made from a mesh wire or metallic frame that may sit on top of the payload holder 306 and/or the payload insert 304.

Figure 5:
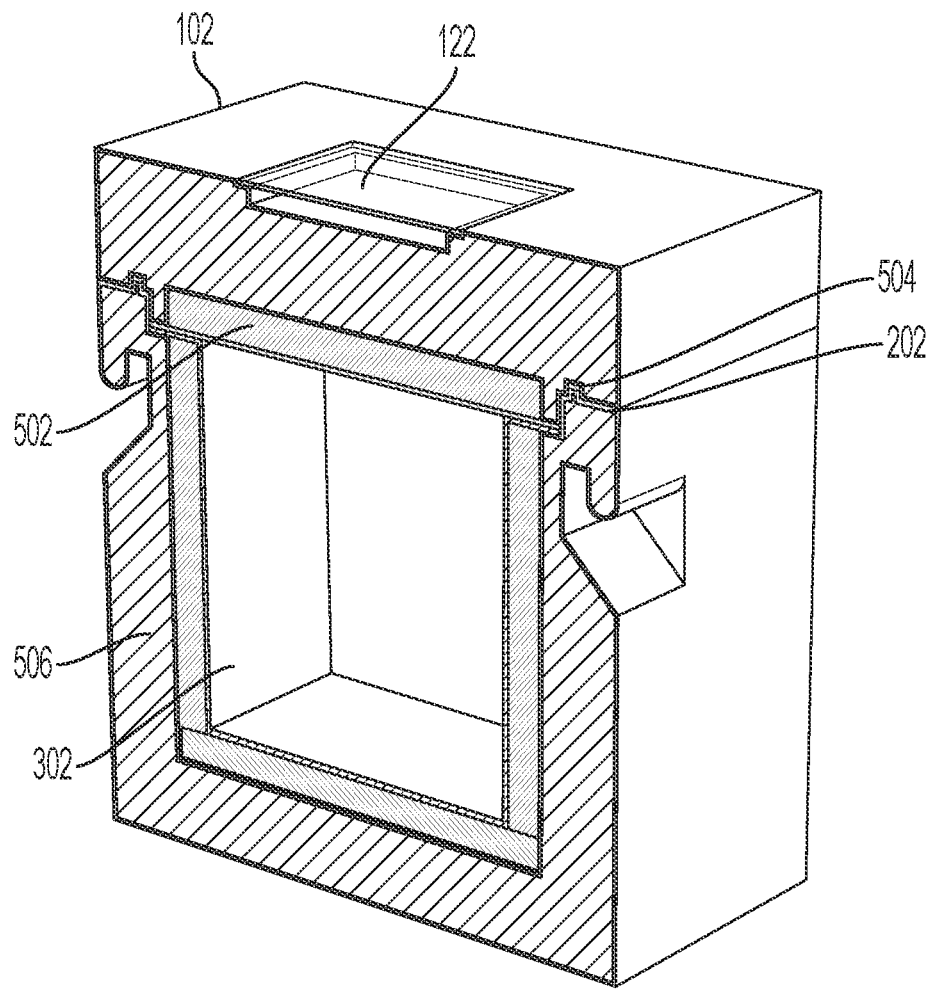
FIG. 5 shows a cross-sectional view of the hardened, reusable and/or modular shipping container of FIG. 1A that operates in multiple temperature ranges or bands according to an aspect of the disclosure.

In some implementations, the shipper 100 may use one or more vacuum insulated panels (VIPs) 502. One or more of the VIPs 502 may also include one or more layers of phase-change material (PCM) to manage, and/or maintain the temperature within the payload area 302 of the shipper 100, as shown in FIG. 5 for example. The one or more VIPs 502 (and/or the PCM) may be positioned within the payload area 302. The one or more VIPs 502 (and/or the PCM) may be interchangeable with the payload insert 304 (see FIG. 4), the payload holder 306, and the dry ice basket 308. The PCM may be layered on an inner surface facing the payload area 302 of the one or more VIPs 502. This allows the shipper 100 to manage and/or maintain the temperature within the payload area 302 in different and multiple temperature ranges and/or bands in comparison to using dry ice as the cooling material.

FIG. 5 shows a cross-sectional view of the shipper 100 using one or more VIPs 502 and PCM to manage and/or maintain the temperature. The one or more VIPs 502 and PCM facilitate the use of the shipper 100 in multiple temperature ranges and/or bands, such as approximately between −80° C. to −60° C., −25° C. to −15° C., 2° C. to 8° C., and 15° C. to 25° C. temperature ranges. These temperature ranges maintain the payload in a desired temperature condition for a predefined duration of time. In various embodiments, the desired temperature condition is a desired state of matter. For instance, the payload may be maintained in a frozen state for a predefined length of time.

The one or more VIPs 502 may be positioned within or adjacent to the lid 102, such as in a recessed portion on an inner surface of the lid 102 and/or within or adjacent to the sides of the payload area 302 so that when the lid 102 is in the closed position, the one or more VIPs 502 may enclose the payload area 302 and form an inner body shell around the payload area 302.

The PCM is a substance which releases and/or absorbs sufficient energy at phase transition to provide useful heat and/or cooling. The PCM may transition from between a solid and a liquid. Different PCMs may be designed to maintain the temperature within the payload area 302 at and/or within different temperature ranges and/or bands. The PCM may be a layer of thin film or a panel positioned and/or placed around and/or on the inner surface of the one or more VIPs 502.

Figure 7:
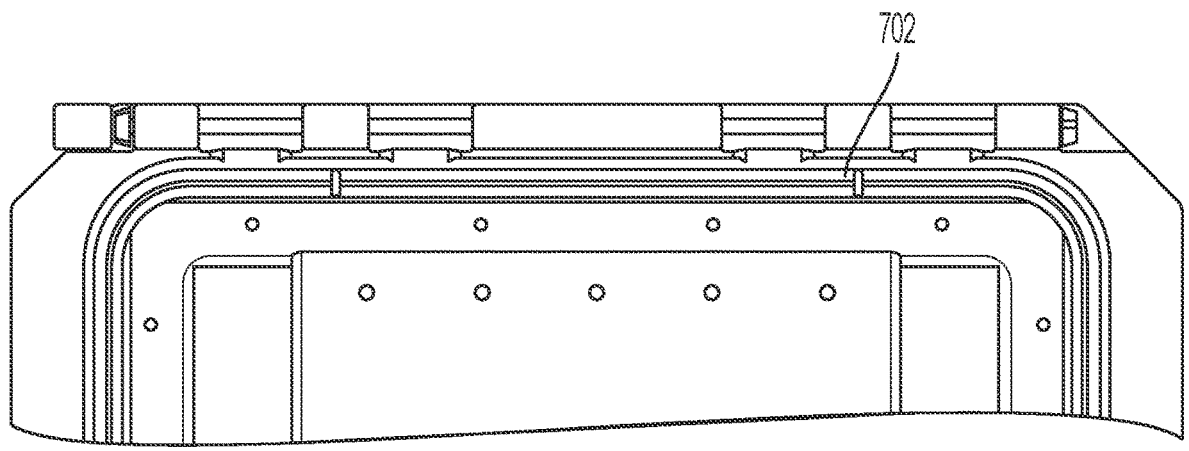
FIG. 7 shows a sectional view of the hardened, reusable and/or modular shipping container of FIG. 1A that shows the one or more holes according to an aspect of the disclosure.

The shipper 100 may have a gasket 504. The gasket 504 provides a seal between the lid 102 and the base 104 when the lid 102 is in the closed position, and so, the shipper 100 may be watertight while allowing gas to pass through the vent 202. In some implementations, the gasket 504 has one or more specially designed holes 702, as shown in FIG. 7 for example. The one or more specially designed holes 702 may allow gas to escape. For example, the holes 702 may permit gas to escape the vent 202 (see FIG. 2) fail. The shipper 100 may have a foam 506, such as a polyurethane foam, to provide insulation to maintain the temperature within the payload area 302 and to provide structural support to the shipper 100. The foam 506 in combination with the one or more VIPs 502 and/or the layer of PCM provide for extended maintainability of the controlled temperature environment within the payload area 302.

Figure 6:
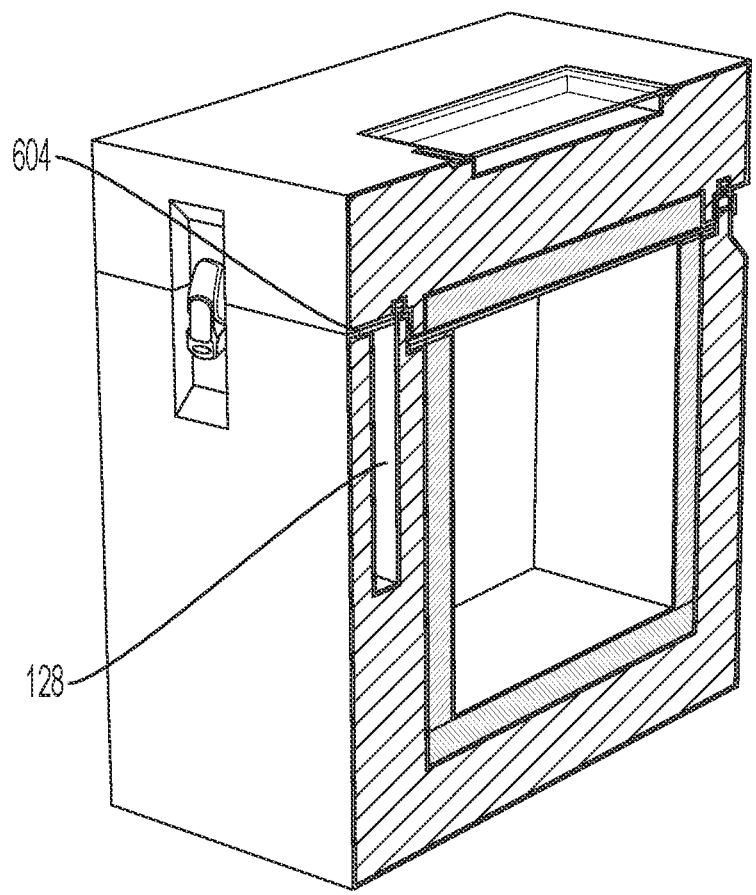
FIG. 6 shows a cross-sectional view of the hardened, reusable and/or modular shipping container of FIG. 1A that shows the electronic device cavity and the thermocouple channel according to an aspect of the disclosure.

The shipper 100 may have an electronic device cavity 128 and/or a thermocouple channel 604 as shown in FIG. 6. The electronic device cavity 128 may be between an exterior and an interior of the base 104 (see FIG. 1A). The electronic device cavity 128 may have an opening accessible from a top of the base 104. The electronic device cavity 128 may allow a data logger or other electronic device to be positioned within the shipper 100 to receive, monitor, store, and transmit sensor data detected within the payload area 302. The thermocouple channel 604 may be a channel that allows one or more wires from a thermocouple device that is positioned within the payload area 302 to be electrically coupled with the data logger within the electronic device cavity 128 and/or the e-label 126. The data logger within the electronic device cavity 128 may communicate wirelessly or via a wired connection to another computing device outside the shipper 100.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A hardened reusable shipping container, comprising:
   a lid configured to be opened and closed;
   a base enclosure coupled to the lid and having a payload area that is configured to receive a payload and maintain a temperature of an environment surrounding the payload;
   an insert comprising a partial basket with sides and downwardly extending feet, one foot of the downwardly extending feet at each corner of the partial basket, the feet raising a floor of the partial basket above a floor of the payload area and defining a first portion of an opening area therebetween to receive a phase change material, the sides of the partial basket being parallel to sides of the payload area and inset therefrom to define a second portion of the opening area to receive a phase change material between the sides of the partial basket and sides of the payload area, the insert positioned within the payload area and to maintain the temperature of the environment surrounding the payload,
   wherein the insert is a payload insert that houses dry ice below and around sides of the payload insert to allow the dry ice to be placed below and around the payload when inserted; and
   a payload holder comprising a tray with a floor and two sidewalls extending upwardly from the floor at opposite sides and resting on edges of the sides of the partial basket of the insert, the payload holder positionable inside the insert to define an area between the floor of the payload holder and at least one of the floor of the insert and the floor of the payload area, the area to further receive the phase-change material in the area between the floor of the payload holder and at least one of the floor of the insert and the floor of the payload area, the tray separating the payload from the phase change material, the floor of the tray providing a mechanical barrier between the payload and the phase change material, wherein the payload holder is configured to be positioned and to fit within the insert and to receive the payload when the payload is inserted within, wherein the payload holder is configured to hold and position the payload within the insert, wherein the combination of the payload holder and the insert is configured to physically separate the payload from the phase-change material.

2. The hardened reusable shipping container of claim 1, further comprising:
   a phase-change material basket positioned above the payload holder and the payload insert and configured to hold the phase-change material so that the phase-change material is at least partially on top of and at least partially covers the payload when the payload is within the payload holder, wherein the combination of the insert, the payload holder, and the phase-change material basket define a hexadron area for the payload, and wherein the phase-change material is constrained outside of the hexadron.

3. The hardened reusable shipping container of claim 1, further comprising:
   a vent positioned on the base enclosure and configured to allow for gas to be released from the payload area.

4. The hardened reusable shipping container of claim 1, further comprising:
   one or more channel recessed within faces of the lid and the base enclosure and extending fully from one edge of at least one face of at least one of the lid and the base enclosure to another opposite edge of the at least one face of the at least one of the lid and the base enclosure; and
   one or more fastener positioned within the one or more channel to couple the lid with the base enclosure when the lid is in the closed position.

5. The hardened reusable shipping container of claim 1, further comprising:
   a document compartment at least partially recessed within the lid and configured receive one or more documents.

6. The hardened reusable shipping container of claim 1, wherein at least a portion of a rear face of the base enclosure is removable.

7. A hardened reusable shipping container, comprising:
   a lid configured to be opened and closed;
   a base enclosure coupled to the lid and having a payload area that is configured to receive a payload and maintain a temperature of an environment surrounding the payload; and
   an insert comprising a partial basket with sides and downwardly extending feet, one foot of the downwardly extending feet at each corner of the partial basket, the feet raising a floor of the partial basket above a floor of the payload area and defining a first portion of an opening area therebetween to receive a phase change material, the sides of the partial basket being parallel to sides of the payload area and inset therefrom to define a second portion of the opening area to receive a phase change material between the sides of the partial basket and sides of the payload area, the insert positioned within the payload area and to maintain the temperature of the environment surrounding the payload,
   wherein the insert comprises a curved cantilevered flange extending from a side of the insert then downwardly, then outwardly, and then upwardly in a curved U-shape into the opening area to route electrical cabling from the payload area, wherein the cable routing allows one or more probes to be inserted within the payload area.

8. A hardened reusable shipping container, comprising:

a lid configured to be opened and closed;

a base enclosure coupled to the lid and having a payload area that is configured to receive a payload and maintain a temperature of an environment surrounding the payload;

an insert comprising a partial basket with sides and downwardly extending feet, one foot of the downwardly extending feet at each corner of the partial basket, the feet raising a floor of the partial basket above a floor of the payload area and defining a first portion of an opening area therebetween to receive a phase change material, the sides of the partial basket being parallel to sides of the payload area and inset therefrom to define a second portion of the opening area to receive a phase change material between the sides of the partial basket and sides of the payload area, the insert positioned within the payload area and to maintain the temperature of the environment surrounding the payload; and a layer of phase-change material on an inner surface of the insert, the inner surface facing toward the payload, wherein the insert is a removable vacuum insulated panel.

* * * * *